US012780193B2

(12) United States Patent
Ishii et al.

(10) Patent No.: US 12,780,193 B2
(45) Date of Patent: Nov. 3, 2026

(54) ERRONEOUS ACCELERATOR OPERATION DETERMINATION DEVICE AND CONTROL DEVICE

(71) Applicants: TOYOTA JIDOSHA KABUSHIKI KAISHA, Toyota (JP); DENSO CORPORATION, Kariya-city (JP)

(72) Inventors: Ryo Ishii, Toyota (JP); Masashi Oishi, Owariasahi (JP); Takuya Kaminade, Okazaki (JP); Naoya Matsunaga, Nagoya (JP); Masaki Ikai, Toyota (JP)

(73) Assignees: TOYOTA JIDOSHA KABUSHIKI KAISHA, Toyota (JP); DENSO CORPORATION, Kariya-city (JP)

( * ) Notice: Subject to any disclaimer, the term of this patent is extended or adjusted under 35 U.S.C. 154(b) by 56 days.

(21) Appl. No.: 18/985,460

(22) Filed: Dec. 18, 2024

(65) Prior Publication Data

US 2025/0222927 A1 Jul. 10, 2025

(30) Foreign Application Priority Data

Jan. 9, 2024 (JP) ................................ 2024-001449

(51) Int. Cl.
*B60W 30/14* (2006.01)

(52) U.S. Cl.
CPC ....... *B60W 30/143* (2013.01); *B60W 2520/10* (2013.01); *B60W 2540/10* (2013.01); *B60W 2540/12* (2013.01); *B60W 2540/20* (2013.01); *B60W 2552/15* (2020.02)

(58) Field of Classification Search
CPC ........... B60W 30/143; B60W 2552/15; B60W 2520/10; B60W 2540/10; B60W 2540/12; B60W 2540/20
See application file for complete search history.

(56) References Cited

U.S. PATENT DOCUMENTS

| | | | | |
|---|---|---|---|---|
| 2021/0039665 | A1 | 2/2021 | Kaminade et al. | |
| 2022/0396270 | A1* | 12/2022 | Koh | B60W 10/06 |
| 2023/0303071 | A1* | 9/2023 | Kobayashi | B60W 30/09 |
| 2024/0067177 | A1* | 2/2024 | Yoshikawa | B60W 50/14 |
| 2024/0067198 | A1* | 2/2024 | Yoshikawa | B60W 30/143 |
| 2024/0199027 | A1* | 6/2024 | Yoon | B60L 15/20 |

FOREIGN PATENT DOCUMENTS

| | | | |
|---|---|---|---|
| JP | 2021-028187 | A | 2/2021 |

* cited by examiner

*Primary Examiner* — Kenneth M Dunne
(74) *Attorney, Agent, or Firm* — Sughrue Mion, PLLC

(57) ABSTRACT

A vehicle control device equipped with a determination device which determines that accelerator operation by a driver is erroneous when an accelerator operation state determination condition and a driving state determination condition are satisfied, in which the determination device performs condition relaxation for a preset control time to relax at least one of the accelerator operation state determination condition and the driving state determination condition when, in a situation where the shift position is in a non-drive range, the accelerator opening degree continued to be equal to or greater than a first reference value for a reference duration time, and then the accelerator opening degree became equal to or less than a second reference value that is smaller than the first reference value, and the shift position is switched to the drive range.

6 Claims, 3 Drawing Sheets

ERRONEOUS ACCELERATOR OPERATION DETERMINATION DEVICE AND CONTROL DEVICE

CROSS-REFERENCE TO RELATED APPLICATION

This application claims priority to Japanese Patent Application No. JP2024-001449 filed on Jan. 9, 2024, the content of which is hereby incorporated by reference in its entirety into this application.

BACKGROUND

1. Technical Field

The present disclosure relates to a vehicle control device for a vehicle such as an automobile, and more particularly to a vehicle control device that suppresses driving force when accelerator operation by a driver is erroneous.

2. Description of the Related Art

As one of the control devices for vehicles such as automobiles, a vehicle control device is known to suppress acceleration of a vehicle by suppressing driving force of the vehicle when it is determined that an accelerator pedal has been erroneously operated by a driver.

For example, Japanese Patent Application Laid-open No. 2021-28187 describes a vehicle control device configured to be able to determine an erroneous accelerator operation by a driver under predetermined determination conditions and to suppress driving force of a vehicle at an appropriate timing.

In a driving force suppression control of a vehicle to deal with erroneous accelerator operation, it is necessary to suppress driving force based on proper determination of erroneous accelerator operation while preventing erroneous determination of erroneous accelerator operation, and for this purpose, the determination conditions for determining erroneous accelerator operation need to be further improved.

SUMMARY

The present disclosure provides a vehicle control device improved to be able to determine erroneous accelerator operation under determination conditions that can determine the erroneous accelerator operation more appropriately than before, and to be able to suppress driving force appropriately.

According to the present disclosure, a vehicle control device is provided that is equipped with a determination device that determines that an accelerator operation by a driver is an erroneous operation when, in a situation where a shift position is in a drive range, an accelerator operation state determination condition for determining that the accelerator operation state of the driver is a predetermined accelerator operation state and a driving state determination condition for determining that driving state of a vehicle is a predetermined driving state are satisfied.

The determination device is configured to perform condition relaxation for a preset control time to relax at least one of the accelerator operation state determination condition and the driving state determination condition so that the accelerator operation by the driver is easily determined to be an erroneous operation when, in a situation where the shift position is in a non-drive range, a situation where the accelerator opening degree was equal to or greater than a first reference value continued for a period exceeding a reference duration time, and then the accelerator opening degree became equal to or less than a second reference value that is smaller than the first reference value, and then the shift position is switched to the drive range.

After examining a large number of data concerning erroneous operation of an accelerator pedal, it was found that when a prescribed accelerator operation is performed by a driver in a situation where a driving force is not transmitted to drive wheels, there is a high possibility that the driver will perform an erroneous operation of the accelerator pedal in a situation where the driving force is subsequently transmitted to the drive wheels. Furthermore, it was found that it is necessary to relax a predetermined determination condition for determining the erroneous operation of the accelerator pedal in order to accurately determine that the accelerator pedal is operated erroneously.

According to the above configuration, when a specific condition is satisfied, at least one of the accelerator operation status determination condition and the driving status determination condition is relaxed for the preset control time so that the accelerator operation by the driver is more easily determined to be an error operation for a preset control time. The specific condition is a condition that, in a situation where the shift position is in the non-drive range, the situation where the accelerator opening degree was equal to or greater than the first reference value continued for a period exceeding the reference duration time, and then the accelerator opening degree became equal to or less than the second reference value and then the shift position is further switched to the drive range.

Therefore, when the specific condition is satisfied, the accelerator operation by the driver is more likely to be determined to be error, so that the erroneous accelerator operation by the driver can be determined properly and the driving force can be properly restrained, as compared to where neither the accelerator operation status determination condition nor the driving status determination condition is relaxed.

In one aspect of the disclosure, the accelerator operation status determination condition includes a condition that the accelerator opening degree is equal to or greater than a third reference value, and the condition relaxation includes reducing the third reference value.

According to the above aspect, the accelerator operation status determination condition includes a condition that the accelerator opening degree is equal to or greater than the third reference value, and the determination condition is relaxed by making the third reference value smaller. Thus, it can be easier to determine that the accelerator opening degree is equal to or greater the third reference value.

In another aspect of the disclosure, the accelerator operation status determination condition includes a condition that an elapsed time since an accelerator opening related amount became equal to or greater than a fourth reference value is equal to or less than a reference elapsed time and the accelerator opening degree is equal to or greater than the third reference value.

According to the above aspect, the accelerator operation status determination condition includes a condition that the elapsed time since the accelerator opening related amount became equal to or greater than the fourth reference value is equal to or less than the reference elapsed time and the accelerator opening degree is equal to or greater than the third reference value, and the third reference value is made smaller, thereby relaxing the determination condition. Thus, it can be easier to determine that the elapsed time since the accelerator opening degree became equal to or greater than the fourth reference value is equal to or less than the reference elapsed time and the accelerator opening degree is equal to or greater than the third reference value.

In another aspect of the disclosure, the determination device obtains information on a vehicle speed, the driving condition determination condition includes a condition that the vehicle speed is equal to or less than a vehicle speed reference value, and the condition relaxation includes increasing the vehicle speed reference value.

According to the above aspect, the driving condition includes a condition that the vehicle speed is equal to or less than the vehicle speed reference value, and the condition is relaxed by increasing the vehicle speed reference value. Thus, it can be easier to determine that the vehicle speed is below the vehicle speed reference value.

Furthermore, in another aspect of the disclosure, the determination device obtains information on a gradient of a road surface, the driving condition determination condition includes a condition that the gradient of the road surface is equal to or less than a reference gradient, and the condition relaxation includes increasing the reference gradient.

According to the above aspect, the driving condition includes a condition that the road surface gradient is equal to or less than the reference gradient, and the determination condition is relaxed by increasing the reference gradient. Therefore, it can be easier to determine that the road surface gradient is equal to or less than the reference gradient.

Furthermore, in another aspect of the disclosure, the determination device acquires information on at least one of brake operation and blinker operation by the driver, wherein the driving state determination condition includes a condition that the operation of the acquired information has not been performed between now and a determination time ago, and wherein the condition relaxation includes reducing the determination time.

According to the above aspect, the driving condition includes a condition that at least one of the brake operation and blinker operation has not been performed between now and the determination time ago, and the determination condition is relaxed by reducing the determination time. Therefore, it can be easier to determine that at least one of the brake operation and blinker operation has not been performed between now and the determination time ago.

Other objects, other features and attendant advantages of the present disclosure will be readily understood from the description of the embodiments of the present disclosure described with reference to the following drawings.

DETAILED DESCRIPTION

The vehicle control device according to the embodiment of the present disclosure will now be described in detail with reference to the accompanying drawings.

Figure 1:
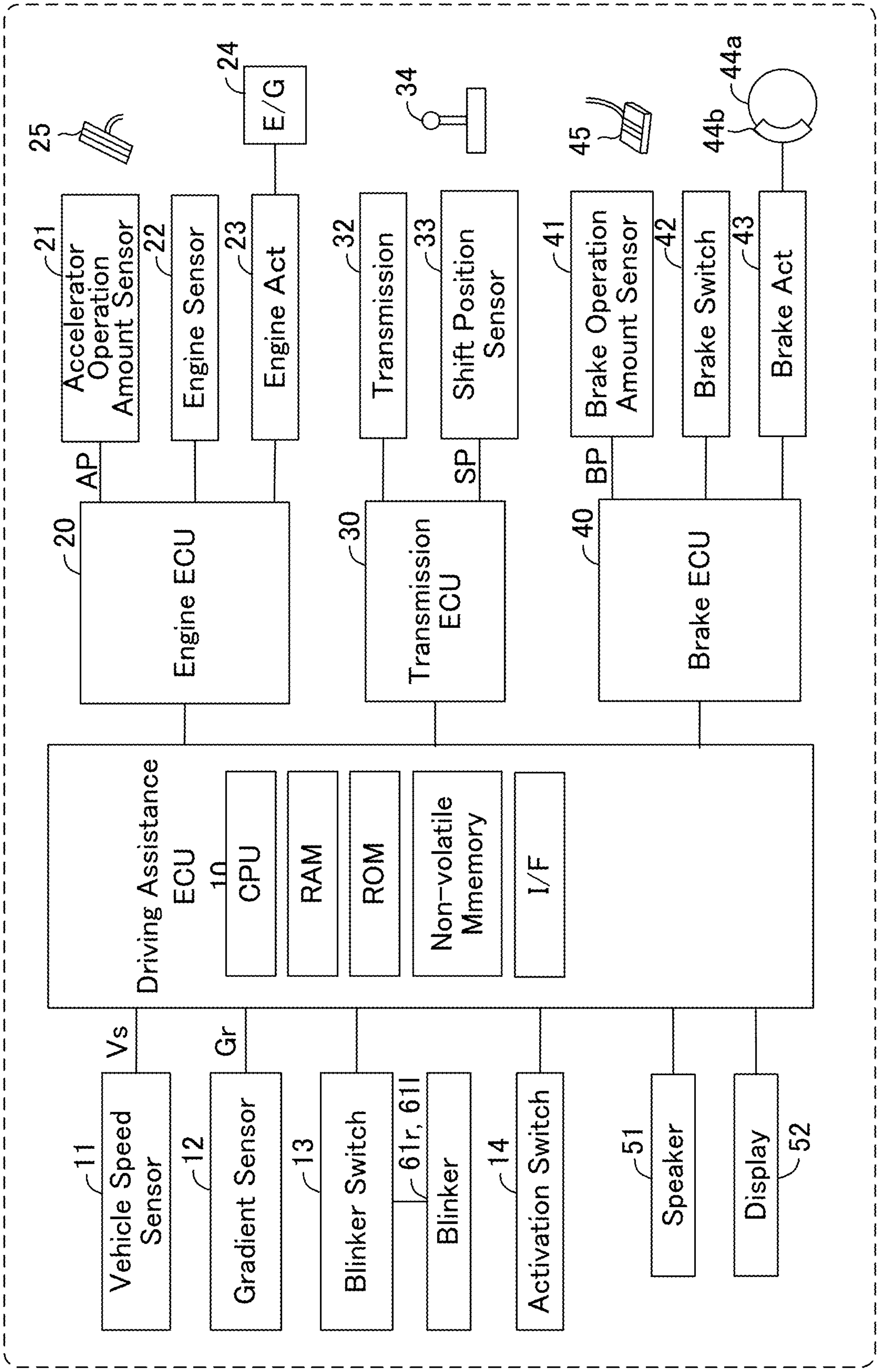
FIG. 1 is a schematic diagram showing an embodiment of a vehicle control device according to the present disclosure.

As shown in FIG. 1, a vehicle control device 100 of the embodiment of the present disclosure is applied to a vehicle 102 and includes a driving assistance ECU 10. The vehicle 102 is a vehicle capable of automatic driving and is equipped with an engine ECU 20, a transmission ECU 30, and a brake ECU 40. ECU means an electronic control unit having a microcomputer as a major part. Some or all of the above ECUs may be integrated into a single ECU.

The microcomputer in each ECU includes a CPU, a ROM, a RAM, a read/write non-volatile memory (N/M), and an interface (I/F), etc. The CPU performs various functions by executing instructions (programs and routines) stored in the ROM. Furthermore, these ECUs are connected to each other via CAN (Controller Area Network) to enable data exchange (communication). Therefore, detected values, etc. of sensors (including switches) connected to a particular ECU are also transmitted to other ECUs.

The driving assistance ECU 10 is a central control unit that performs driving controls such as driving force suppression control including determination of erroneous operation of an accelerator pedal, lane departure prevention control, and other driving assistance controls, and in the embodiment, the driving assistance ECU 10 functions with other ECUs to perform driving force suppression control, as described in detail later.

The driving assistance ECU 10 is connected to a vehicle speed sensor 11, a gradient sensor 12, a blinker switch 13, and an activation switch 14, and receives their detection or output signals.

The vehicle speed sensor 11 detects a vehicle speed Vs, which is a traveling speed of the vehicle 102, and outputs a signal indicating the vehicle speed to the driving assistance ECU 10.

The gradient sensor 12 includes, for example, a 2-axis acceleration sensor that detects an acceleration of the vehicle 102 in a longitudinal direction and an acceleration of the vehicle in the vertical direction, and outputs to the driving assistance ECU 10 a signal indicating a gradient Gr of a traveling road surface in a travel direction of the vehicle. For example, the gradient sensor 12 detects the gradient Gr based on a ratio of the acceleration in the longitudinal direction and the acceleration in the vertical direction. The gradient Gr is "0" when the vehicle 102 is traveling on a level surface. The gradient Gr is positive (Gr>0) when the vehicle 102 is traveling uphill and negative (Gr<0) when the vehicle 102 is traveling downhill.

The blinker switch 13 is used to switch left and right blinkers (direction indicators) 61L and 61R between on and off states. A driver operates a blinker lever (not shown) to activate (blink) the left and right blinkers 61L and 61R. The blinker lever can be operated in at least a first position and a second position. The first position is a position pivoted clockwise by a predetermined angle from an initial position. The second position is a position pivoted counterclockwise by a predetermined angle from the initial position.

The blinker switch 13 turns on and blinks the right blinker 61R when the blinker lever is in the first position. The blinker switch 13 outputs a signal to the driving assistance ECU 10 indicating that the right blinker 61R is in the on state. When the blinker lever is in the second position, the blinker switch 13 turns on and blinks the left blinker 61L. In this case, the blinker switch 13 outputs a signal to the driving assistance ECU 10 indicating that the left blinker 61L is in the on state. When the left and right blinkers 61L and 61R are in the off state, the blinker switch 13 outputs a signal indicating that fact to the driving assistance ECU 10.

The activation switch 14 is provided at a position operable by the driver and is operated by the driver to set whether or not the driving force suppression control is to be executed. When the activation switch 14 is on, the driving force suppression control is executed, and when the activation switch 14 is off, the driving force suppression control is not executed. The driving force suppression control will be explained in detail later.

The engine ECU 20 is connected to an accelerator operation amount sensor 21 and an engine sensor 22. The accelerator operation amount sensor 21 detects an accelerator opening degree AP [%] as an amount of operation of an accelerator pedal 25 by the driver, and outputs a signal indicating the accelerator opening degree AP to the engine ECU 20. The accelerator pedal 25 is an acceleration actuator operated by the driver to accelerate the vehicle 102.

If the driver is not operating the accelerator pedal 25, i.e., if the driver is not depressing the accelerator pedal 25, the accelerator opening degree AP is 0%. The larger the amount the driver depresses the accelerator pedal 25, the larger the accelerator opening degree AP becomes. The engine ECU 20 sends a signal indicating the accelerator opening degree AP received from the accelerator operation amount sensor 21 to the driving assistance ECU 10.

The engine sensor 22 is a sensor that detects operating state amounts of an internal combustion engine 24. The engine sensor 22 includes a throttle valve opening sensor, an engine speed sensor, and an intake air volume sensor.

Furthermore, the engine ECU 20 is connected to an engine actuator 23. The engine actuator 23 includes a throttle valve actuator that changes an opening of a throttle valve of the internal combustion engine 24. The engine ECU 20 can drive the engine actuator 23 to change a torque generated by the internal combustion engine 24. The torque generated by the internal combustion engine 24 is transmitted to drive wheels (not shown) via the transmission 32. Therefore, the engine ECU 20 can control a driving force of the vehicle 102 and change an acceleration state (acceleration) by controlling the engine actuator 23.

When the vehicle is a hybrid vehicle, the engine ECU 20 controls the driving force of the vehicle generated by one or both of an internal combustion engine and an electric motor as a vehicle drive source. Furthermore, when the vehicle is an electric vehicle, the engine ECU 20 controls the driving force of the vehicle generated by an electric motor as the vehicle drive source.

The transmission ECU 30 is connected to a transmission 32 and a shift position sensor 33. The transmission 32 is installed between the internal combustion engine 24 and the drive wheels, and transmits driving force from the internal combustion engine to the drive wheels by changing a torque, speed, and direction of rotation. The changes in torque, speed, and direction of rotation are determined by a shift position SP, which is set by a shift lever 34 operated by the driver. The shift position SP consists of a non-drive range (N range and P range) in which a drive power is not transmitted from the internal combustion engine to the drive wheels, and a drive range (D range, 2 range, R range, etc.) in which the drive power is transmitted from the internal combustion engine to the drive wheels.

The shift position sensor 33 detects the shift position SP and outputs a signal indicating the shift position to the transmission ECU 30. The transmission ECU 30 controls the shift position of the transmission 32 to be a shift position corresponding to the shift position SP. Further, the transmission ECU 30 transmits a signal indicating the shift position SP to the driving assistance ECU 10.

The brake ECU 40 is connected to a brake operation amount sensor 41 and a brake switch 42. The brake operation amount sensor 41 detects a tread force on a brake pedal 45 or a pressure in a master cylinder (not shown) as a brake operation amount BP, and outputs a signal indicating the brake operation amount BP to the brake ECU 40. The brake pedal 45 is a deceleration operator operated by the driver to decelerate the vehicle 102.

If the driver does not depress the brake pedal 45, the brake operation amount BP is 0. The larger an amount the driver depresses the brake pedal 45, the larger the brake operation amount BP becomes. The brake ECU 40 transmits a signal indicating the brake operation amount BP received from the brake operation amount sensor 41 to the driving assistance ECU 10.

The brake switch 42 outputs an ON signal to the brake ECU 40 when the brake pedal 45 is depressed and an OFF signal to the brake ECU 40 when the brake pedal 45 is not depressed. The brake ECU 40 transmits the signal received from the brake switch 42 to the driving assistance ECU 10.

Furthermore, the brake ECU 40 is connected to a brake actuator 43. A braking force (braking torque) on each wheel is controlled by the brake actuator 43 being controlled by the brake ECU 40. The brake actuator 43 adjusts a hydraulic pressure supplied to each wheel cylinder built into a brake caliper **44*b* in response to instructions from the brake ECU 40, and the hydraulic pressure presses brake pads against a brake disc 44*a* to generate frictional braking force. Thus, the brake ECU 40 can control a braking force of the vehicle by controlling the brake actuator 43**.

Furthermore, the driving assistance ECU 10 is connected to a speaker 51 and a display 52. The display 52 may be a multi-information display provided in front of the driver's seat. In addition to displaying measured values such as vehicle speed Vs and engine speed, the display 52 displays various information such as whether or not the driving force suppression control is on. A head-up display may be employed as the display 52.

The driving assistance ECU 10 functions as a determination device that determines whether or not the operation of the accelerator pedal by the driver is an error operation, as will be described in detail later. When the operation of the accelerator pedal by the driver is determined to be an error operation, the driving assistance ECU 10 executes suppression of driving force by the driving force suppression control, and further, the driving assistance ECU 10 displays the suppression of driving force on the display 52 and outputs an alarm sound to alert the driver with the speaker 51.

Figure 2:
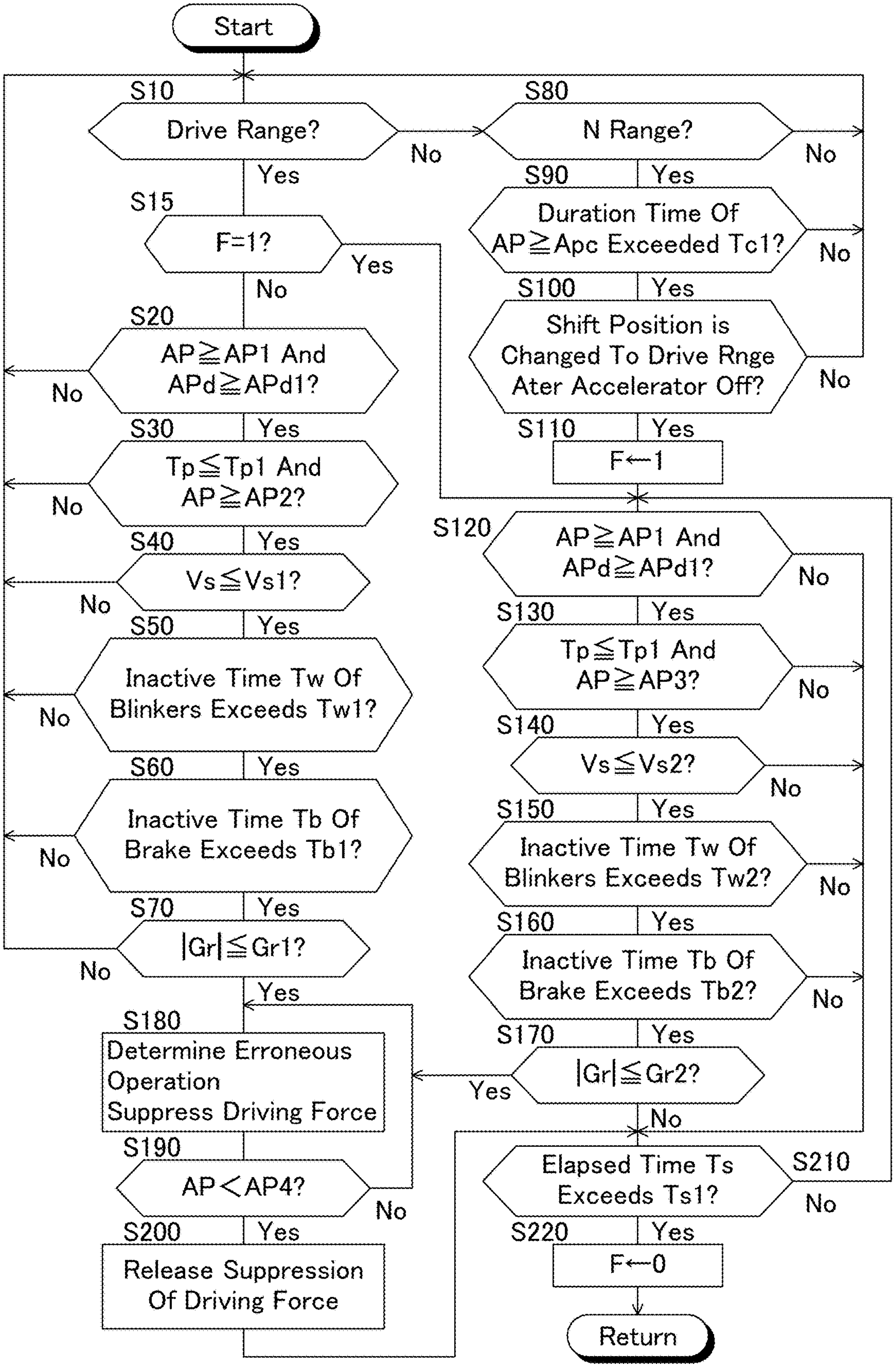
FIG. 2 is a flowchart corresponding to a driving force suppression control program in the embodiment.

In the embodiment, the ROM of the driving assistance ECU 10 stores a driving force suppression control program corresponding to the flowchart shown in FIG. 2.

Driving Force Suppression Control (FIG. 2)

Next, the driving force suppression control in the embodiment is described with reference to the flowchart shown in FIG. 2. The driving force suppression control according to the flowchart shown in FIG. 2 is repeatedly executed by the CPU of the driving assistance ECU 10 at predetermined time intervals in a situation where the activation switch 14 is ON. At the start of the control, a flag F is initialized to 0.

First, in step S10, the CPU determines whether or not the shift position SP is in the drive range. When a negative determination is made, the control proceeds to step S80, and when an affirmative determination is made, the control proceeds to step S15.

In step S15, the CPU determines whether or not the flag F is 1. When an affirmative determination is made, the control proceeds to step S120, and when a negative determination is made, the control proceeds to step S20.

In step S20, the CPU determines whether or not the accelerator opening degree AP is equal to or greater than a reference value AP1 (e.g., a positive constant of 100% or so) and an accelerator opening speed APd, which is a time rate of change of the accelerator opening degree AP, is equal to or greater than a reference value APd1 (e.g., a positive constant of 100%/sec or so). That is, whether or not the accelerator pedal 25 is suddenly and significantly depressed by the driver is determined. When a negative determination is made, the control is temporarily terminated, and when an affirmative determination is made, the control proceeds to step S30. The determination as to whether the accelerator pedal 25 is suddenly and significantly depressed by the driver may be a determination as to whether the accelerator opening degree AP is above the reference value AP1 or whether the accelerator opening speed APd is above the reference value APd1.

In step S30, the CPU determines whether an elapsed time Tp since the determination in step S20 changed from a negative determination to an affirmative determination is less than a reference elapsed time Tp1 (a positive constant) and the accelerator opening degree AP is greater than a reference value AP2 (a positive constant of 90% or so, for example). When a negative determination is made, the control terminates once, and when an affirmative determination is made, the control proceeds to step S40.

In step S40, the CPU determines whether or not the vehicle speed Vs of the vehicle 102 is equal to or less than a reference vehicle speed Vs1 (a positive constant). When a negative determination is made, the control terminates once, and when an affirmative determination is made, the control proceeds to step S50.

In step S50, the CPU determines whether or not a time Tw during which the left and right blinkers 61L and 61R are in the off state exceeds a reference time Tw1 (a positive constant). When a negative determination is made, the control terminates once, and when an affirmative determination is made, the control proceeds to step S60.

In step S60, the CPU determines whether or not a time Tb during which the brake operation amount BP is 0 and the brake is in the off state exceeds a reference time Tb1 (a positive constant). When a negative determination is made, the control terminates once, and when an affirmative determination is made, the control proceeds to step S70.

In step S70, the CPU determines whether or not an absolute value of a gradient Gr of a traveling road surface in a vehicle traveling direction is equal to or less than a reference gradient G1 (a positive constant). When a negative determination is made, the control terminates once, and when an affirmative determination is made, the control proceeds to step S180.

In step S80, the CPU determines whether or not the shift position SP is in the N range. When a negative determination is made, the control terminates once, and when an affirmative determination is made, the control proceeds to step S90.

In step S90, the CPU determines whether or not a duration time To of a situation in which the accelerator opening degree AP was equal to or greater than a reference value AP3 (a positive constant) exceeded a reference duration time Tc1 (a positive constant). When a negative determination is made, the control terminates once, and when an affirmative determination is made, the control proceeds to step S100. An affirmative determination is once made in step S90, the step is skipped until an affirmative determination is made in step S10 or step S210 described below.

In step S100, the CPU determines whether or not the shift position SP has changed to the drive range after the accelerator opening degree AP has reached 0% (accelerator off). When a negative determination is made, the control terminates once, and when an affirmative determination is made, the control proceeds to step S120.

In step S120, as in step S20, the CPU determines whether or not the accelerator opening degree AP is equal to or greater than the reference value AP1 and the accelerator opening speed APd is equal to or greater than the reference value APd1. When a negative determination is made, the control proceeds to step S210, and when an affirmative determination is made, the control proceeds to step S130. As in step S20, the determination as to whether or not the accelerator pedal 25 is suddenly and significantly depressed by the driver may be a determination as to whether or not the accelerator opening degree AP is equal to or greater than the reference value AP1 or whether or not the accelerator opening speed APd is equal to or greater than the reference value APd1.

As explained below, in steps S130 through S170, the conditions for determinations are relaxed as compared to those in steps S30 through S70 and the same determinations are made as in steps S30 through S70, respectively.

In step S130, the CPU determines whether or not an elapsed time Tp since the determination in step S120 changed from a negative determination to an affirmative determination is equal to or greater than the reference elapsed time Tp1 and the accelerator opening degree AP is equal to or greater than a reference value AP3 (a positive constant smaller than AP1). When a negative determination is made, the control proceeds to step S210, and when an affirmative determination is made, the control proceeds to step S140.

In step S140, the CPU determines whether or not the vehicle speed Vs of the vehicle 102 is equal to or less than a reference vehicle speed Vs2 (a positive constant greater than Vs1). When a negative determination is made, the control proceeds to step S210, and when an affirmative determination is made, the control proceeds to step S150.

In step S150, the CPU determines whether or not the time Tw during which the left and right blinkers 61L and 61R are in the off state exceeds a reference time Tw2 (a positive constant smaller than Tw1). When a negative determination is made, the control proceeds to step S210, and when an affirmative determination is made, the control proceeds to step S160.

In step S160, the CPU determines whether or not the time Tb during which the brake operation amount BP is 0 and the brake is in the off state exceeds a reference time Tb2 (a positive constant smaller than Tb1). When a negative determination is made, the control proceeds to step S210, and when an affirmative determination is made, the control proceeds to step S170.

In step S170, the CPU determines whether or not an absolute value of a gradient Gr of a traveling road surface in a vehicle traveling direction is equal to or less than a reference gradient G2 (a positive constant greater than G1). When a negative determination is made, the control proceeds to step S210, and when an affirmative determination is made, the control proceeds to step S180.

In step S180, the CPU determines that the accelerator operation by the driver is an erroneous operation. Further, the CPU outputs a command signal to the engine ECU 20 to reduce the output of the engine 24 to suppress the driving force of the vehicle 102.

In step S190, the CPU determines whether the accelerator opening degree AP is equal to or less than a reference value AP4 (a positive constant). When a negative determination is made, the control returns to step S180, and when an affirmative determination is made, the control proceeds to step S200.

In step S200, the CPU outputs a command signal to the engine ECU 20 to terminate the reduction of the output of the engine 24 to release the suppression of the driving force of the vehicle 102.

In step S210, the CPU determines whether an elapsed time Ts since the determination in step S100 became an affirmative determination exceeds a reference elapsed time Ts1 (a positive constant). When a negative determination is made, the control returns to step S120, and when an affirmative determination is made, in step S220, the flag F is reset to 0 and then the control terminates once. It is to be noted that when an affirmative determination is made in step S70 and step S210 is executed after steps S180 through S200 are executed, an affirmative determination is made in step S210.

As can be seen from the above explanation, in the embodiment, when the shift position SP is in the drive range, steps S20 through S70 and steps S180 through S200 are executed as in the conventional driving force suppression control. As a result, suppression of driving force is performed when the accelerator operation is erroneous.

When the shift position SP is in the N range, a negative determination is made in step S10 and an affirmative determination is made in step S80. Further, when affirmative determinations are made in steps S90 and S100, steps S120 through S170 and steps S180 through S200 are executed to suppress the driving force when the accelerator operation is erroneous.

Figure 3:
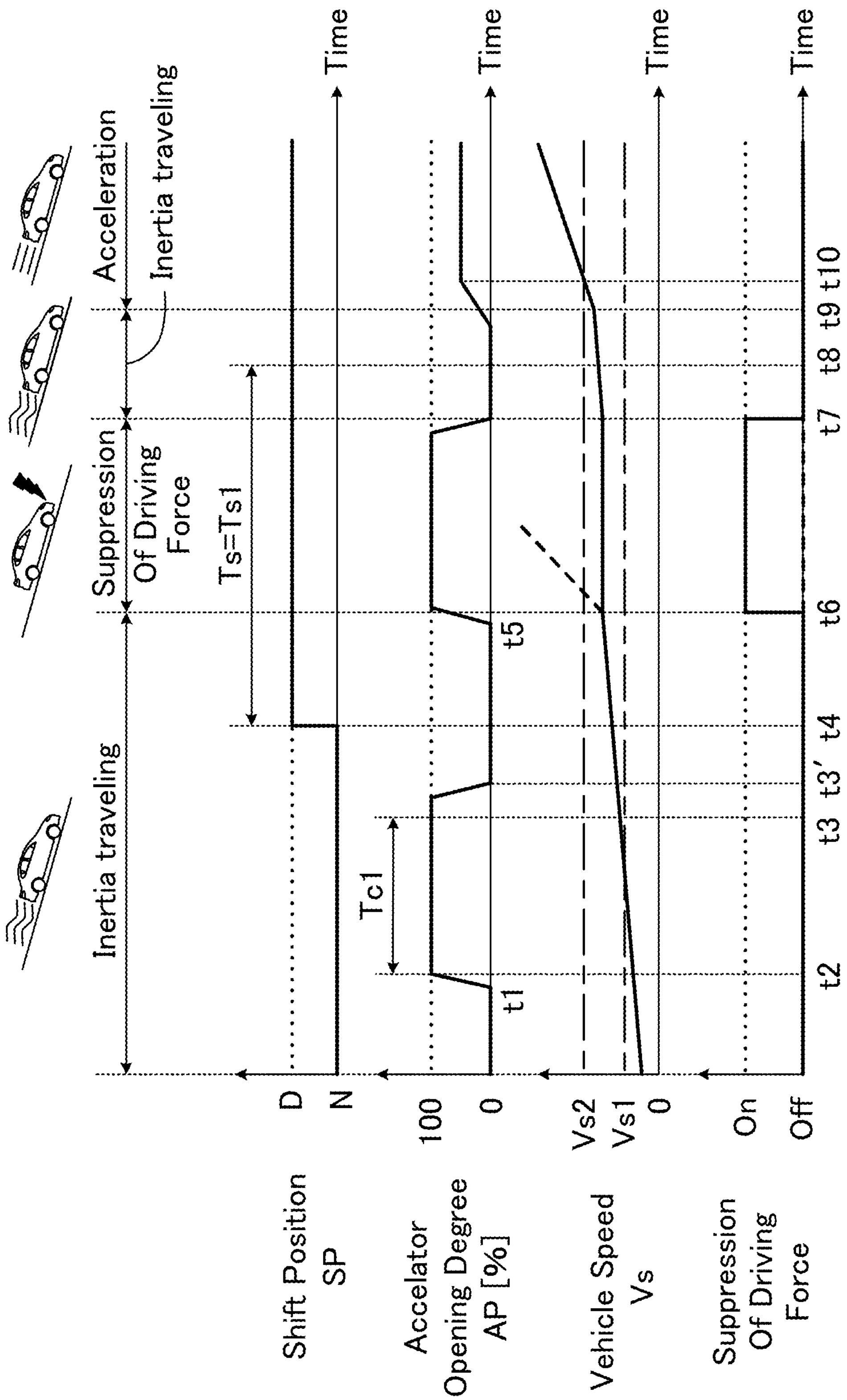
FIG. 3 is a diagram showing an example of the operation of the embodiment when a vehicle is traveling downhill.

Example of the Operation of the Embodiment (FIG. 3)

Referring now to FIG. 3, an example of the operation of the embodiment when the vehicle 102 is traveling downhill is described. In FIG. 3, the first column indicates shift position SP, the second column indicates accelerator opening degree AP, the third column indicates vehicle speed Vs, and the fourth column indicates on or off of driving force suppression.

As shown in FIG. 3, it is assumed that at time point t1 where the shift position SP is in the N range, the driver begins to depress the accelerator pedal 25 rapidly by an erroneous operation. It is further assumed that at time point t2, the accelerator opening degree AP reaches 100% that is greater than APc and the situation continues, and just after time point t3 where an elapsed time Tc from the time point t2 is the reference elapsed time Tc1, the depressing of the accelerator pedal 25 is suddenly reduced and at the time point t3', the accelerator opening degree AP becomes 0%.

Furthermore, it is assumed that at time point t4, the shift position SP changes from N range to D range, and at time point t5, the driver begins to depress the accelerator pedal 25 rapidly by mistake, and at time point t6, the determination in step S120 becomes an affirmative determination. It is assumed that the accelerator opening degree AP is maintained at 100% from immediately after the time point t6 to immediately before time point t7, and that the accelerator opening degree AP drops abruptly to 0% from immediately before the time point t7 to the time point t7.

It is further assumed that at time point t8, the elapsed time Ts from the time point t4 exceeds the reference elapsed time Ts1. Furthermore, It is assumed that that just before time point t9, the accelerator opening degree AP increases relatively gently, and after time point t10, the accelerator opening degree AP becomes constant.

In conventional driving force suppression control, steps S80 through S170 and step S210 are not executed. As shown in FIG. 3, it is assumed that that the vehicle speed Vs gradually increases due to downhill driving, and between the time points t2 and t3, the vehicle speed Vs exceeds the reference vehicle speed Vs1. A negative determination is made in one of step S20 through step S40 and step S180 is not executed. Therefore, from the time point t6 to the time point t7, the driving force is not suppressed, as indicated by the dashed line in the fourth column of FIG. 3. Therefore, a sudden increase in vehicle speed Vs immediately after the time point t5 cannot be prevented.

In contrast, in the embodiment, when the shift position SP is in the N range, a negative determination is made in step S10 and an affirmative determination is made in step S80, so that step S90 and subsequent steps are executed. For example, if the duration time Tc of the situation in which the accelerator opening degree AP is equal to or greater than the reference value AP3 exceeds the reference duration time Tc1, the determination in step S90 becomes an affirmative determination. Also, at the time point T4, the determination of step S100 becomes an affirmative determination and the flag F is changed to 1.

When time elapses from the time point t4 and reaches the time point t6, the determinations in steps S120 and S130 become affirmative determinations. As shown in FIG. 3, if the vehicle speed Vs of the vehicle 102 is less than the reference vehicle speed Vs2, the determination in step S140 also becomes an affirmative determination. If the left and right blinkers 61L and 61R are inoperative and the brake is inoperative, the determinations in steps S150 and S160 will also be affirmative determinations. Furthermore, if an absolute value of a gradient Gr of a traveling road surface in the vehicle's direction of travel is equal to or less than the reference gradient G2, the determination in step S170 will also be an affirmative determination.

Therefore, since steps S180 through S200 are executed to suppress the driving force at the time of erroneous operation of the accelerator pedal, a sudden increase in vehicle speed Vs immediately after the time point t6 can be prevented. When the accelerator opening degree AP becomes less than the reference value AP4, the determination in step S190 becomes an affirmative determination, and the suppression of driving force is released in step S200.

Further, at the time point t8 where the elapsed time Ts from the time point t4 exceeds the reference elapsed time Ts1, the determination in step S210 becomes an affirmative determination and the flag F is reset to zero. Therefore, an affirmative decision is made in step S10 and a negative determination is made in step S15, so that step S20 and subsequent steps are executed. After the time point t8, the driving force of the vehicle 102 is controlled in accordance with the change in the accelerator opening degree AP without being suppressed, so that the vehicle speed Vs increases after the time point t9.

Effects of the Embodiment

As can be seen from the above description, according to the embodiment, when a specific condition is satisfied, at least one of an accelerator operation status determination condition and a driving status determination condition is relaxed so that an accelerator operation by a driver is easily determined as an error operation for the preset control time Ts1 (S130-S170). The specific condition is a condition that, in a situation where a shift position SP is in the non-drive range (S80), a situation where the accelerator opening degree AP is equal to or greater than the first reference value APc continues beyond the reference duration time To1 (S90), and then the accelerator opening degree becomes equal to or less than the second reference value and the shift position is further switched to the drive range (S100).

Therefore, when the specific condition is satisfied, it is easier to determine that the accelerator operation by the driver is erroneous. Accordingly, as compared to where neither the accelerator operation status determination condition nor the driving status determination condition is relaxed, the erroneous accelerator operation can be properly determined and a driving force can be properly controlled.

According to the embodiment, the accelerator operation status determination condition (S20, S30, S120, S130) includes a condition that the accelerator opening degree AP is equal to or greater than a third reference value (AP2, AP3), and the determination condition is relaxed by making the third reference value smaller. Thus, it can be easier to determine that the accelerator opening degree AP is above the third reference value.

In particular, according to the embodiment, the accelerator operation status determination condition (S20, S30, S120, S130) includes a condition that an elapsed time Tp after an accelerator opening related amount (AP and/or APd) becomes equal to or greater than the fourth reference value (AP1 and/or APd1) is equal to or less than the reference elapsed time Tp1 and the accelerator opening degree AP is equal to or greater than the third reference value (AP2, AP3). The third reference value is made smaller, thereby relaxing the determination condition. Thus, it can be easier to determine that the elapsed time since the accelerator opening degree related amount became equal to or greater than the fourth reference value is equal to or less than the reference elapsed time and that the accelerator opening degree is equal to or greater than the third reference value.

According to the embodiment, the driving condition determination condition (S40-S70, S140-S170) includes a condition that the vehicle speed Vs is equal to or less than the vehicle speed reference value (Vs1, Vs2), and the relaxation of the condition is performed by increasing the vehicle speed reference value. Thus, it can be easier to determine that the vehicle speed is equal to or less than the vehicle speed reference value.

According to the embodiment, the driving condition determination condition (S40-S70, S140-S170) includes a condition that the road surface gradient Gr is equal to or less than the reference gradient (Gr1, Gr2), and the determination condition is relaxed by increasing the reference gradient. Thus, it can be easier to determine that the road surface gradient is equal to or less than the reference gradient.

Furthermore, according to the embodiment, the driving condition determination condition (S40-S70, S140-S170) includes a condition that at least one of brake operation and blinker operation has not been performed between now and the determination time ago (S50, S60, S150, S160), and the determination time is reduced so that the determination condition is relaxed. Therefore, it can be easier to determine that at least one of the brake operation and blinker operation has not been performed between now and the determination time ago.

Although the present disclosure has been described in detail with reference to a specific embodiment, it will be apparent to those skilled in the art that the present disclosure is not limited to the above-described embodiment, and various other embodiments are possible within the scope of the present disclosure.

For example, in the above-described embodiment, the reference values in the determinations of steps S130 through S170 are relaxed than the reference values in the determinations of steps S30 through S70, respectively. However, the reference value in the determination of at least one of steps S130 through S170 may be the same as the reference value in the determination of the corresponding step.

In the above-described embodiment, the requirement for blinkers is determined in steps S50 and S150, the requirement for brake is determined in steps S60 and S160, and the requirement for road surface gradient is determined in steps S70 and S170. However, at least one of steps S50 to S70 may be omitted, and correspondingly at least one of steps S150 to S170 may be omitted.

In the above-described embodiment, in step S100, it is determined whether or not the shift position SP is changed to the drive range after the accelerator opening degree AP reached 0%. That is, the second reference value regarding the accelerator opening degree is 0%. However, the second reference value regarding the accelerator opening degree may be a positive constant smaller than the first reference value AP1.

In the above-described embodiment, in step S80, whether or not the shift position SP is in the N range is determined. However, step S80 may be omitted, and when a negative determination is made in step S10, that is, when the shift position SP is determined to be in the non-drive range, the control may proceed to step S100.

Furthermore, in the above-described embodiment, in steps S70 and S170, it is determined whether an absolute value of a gradient Gr of a road surface is equal to or less than the reference gradients G1 and G2, respectively. However, in step S70, it may be determined whether the gradient Gr is equal to or greater than −Grn1 and equal to or less than Grp1, and in step S170, it may be determined whether the gradient Gr is equal to or greater than −Grn2 and equal to or less than Grp2. Notably, the values such as Grn1 are positive constants, and at least one of Grn2 and Grp2 is greater than Grn1 and Grp1, respectively.

What is claimed is:

1. A vehicle control device equipped with a determination device that determines that an accelerator operation by a driver is an erroneous operation when, in a situation where a shift position is in a drive range, an accelerator operation state determination condition for determining that the accelerator operation state of the driver is a predetermined accelerator operation state and a driving state determination condition for determining that driving state of a vehicle is a predetermined driving state are satisfied, wherein the determination device is configured to perform condition relaxation for a preset control time to relax at least one of the accelerator operation state determination condition and the driving state determination condition when, in a situation where the shift position is in a non-drive range, a situation where the accelerator opening degree was equal to or greater than a first reference value continued for a period exceeding a reference duration time, and then the accelerator opening degree became equal to or less than a second reference value that is smaller than the first reference value, and then the shift position is switched to the drive range.

2. The vehicle control device according to claim 1, wherein the accelerator operation status determination condition includes a condition that the accelerator opening degree is equal to or greater than a third reference value, and wherein the condition relaxation includes reducing the third reference value.

3. The vehicle control device according to claim 2, wherein the accelerator operation status determination condition includes a condition that an elapsed time since an accelerator opening related amount became equal to or greater than a fourth reference value is equal to or less than a reference elapsed time and the accelerator opening degree is equal to or greater than the third reference value.

4. The vehicle control device according to claim 1, wherein the determination device obtains information on a vehicle speed, wherein the driving condition determination condition includes a condition that the vehicle speed is equal to or less than a vehicle speed reference value, and wherein the condition relaxation includes increasing the vehicle speed reference value.

5. The vehicle control device according to claim 1, wherein the determination device obtains information on a gradient of a road surface, wherein the driving condition determination condition includes a condition that the gradient of the road surface is equal to or less than a reference gradient, and wherein the condition relaxation includes increasing the reference gradient.

6. The vehicle control device according to claim 1, wherein the determination device acquires information on at least one of brake operation and blinker operation by the driver, wherein the driving state determination condition includes a condition that the operation of the acquired information has not been performed between now and a determination time ago, and wherein the condition relaxation includes reducing the determination time.

* * * * *